July 17, 1962  W. WANIELISTA ET AL  3,044,378
ADJUSTABLE STOP AND RELEASE MECHANISM FOR PHOTOGRAPHIC APPARATUS
Filed Oct. 14, 1959  3 Sheets-Sheet 1

Inventors
Walter Wanielista
Charles Peter Sippel Jr.

By Hill, Sherman, Meroni, Gross & Simpson Attys

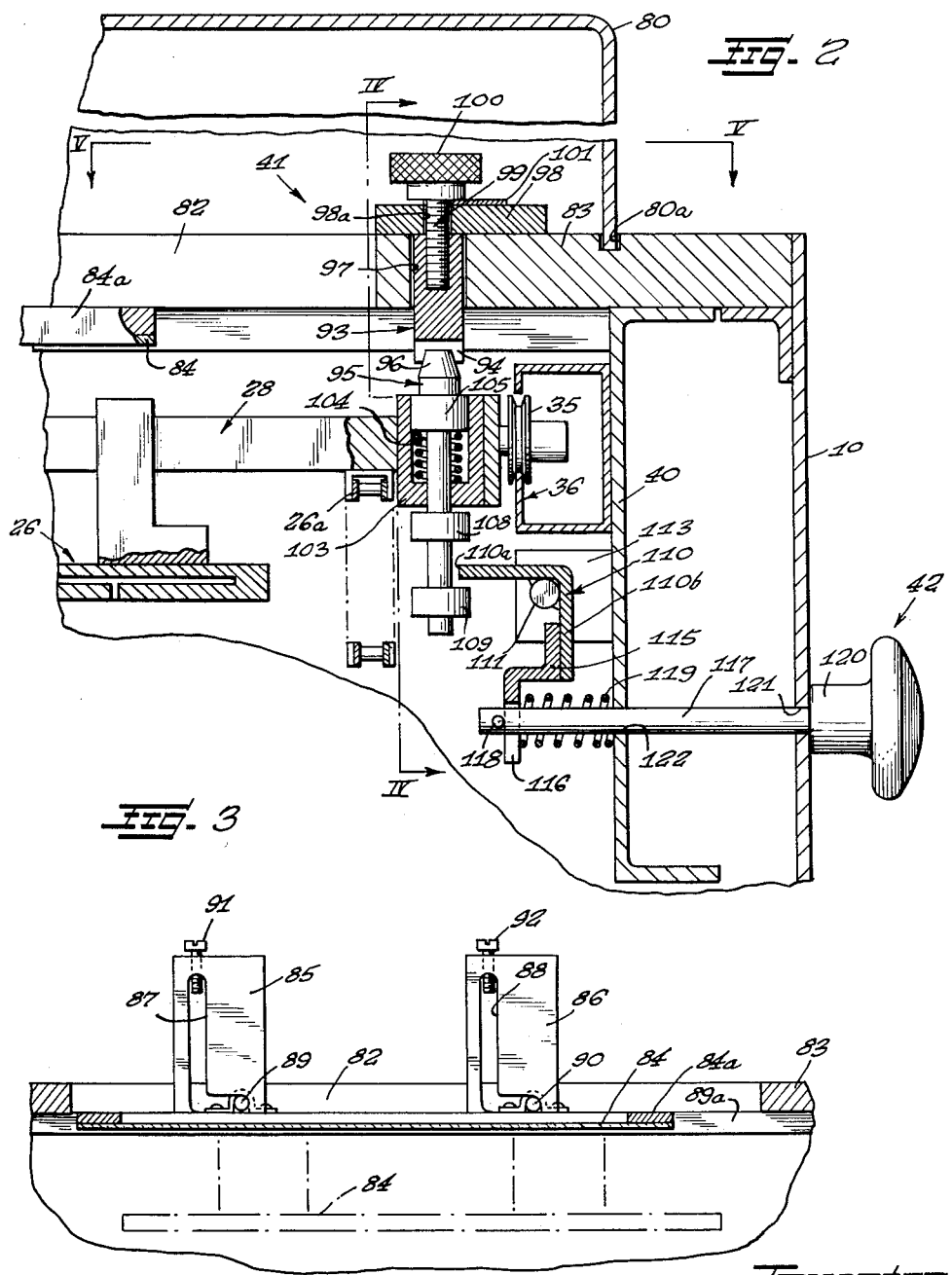

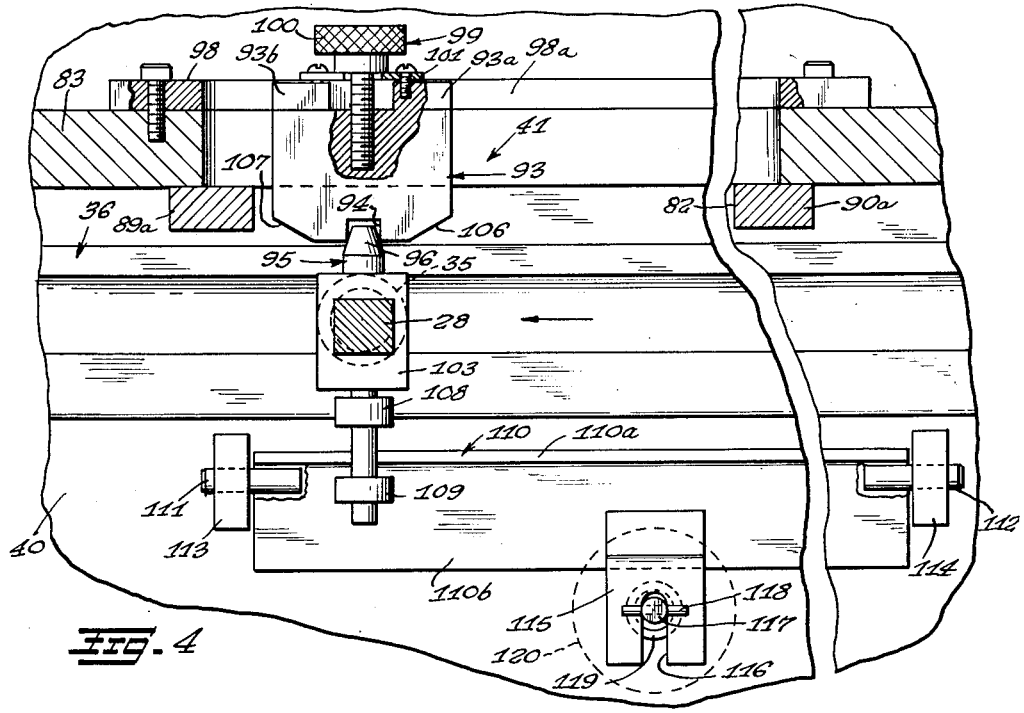
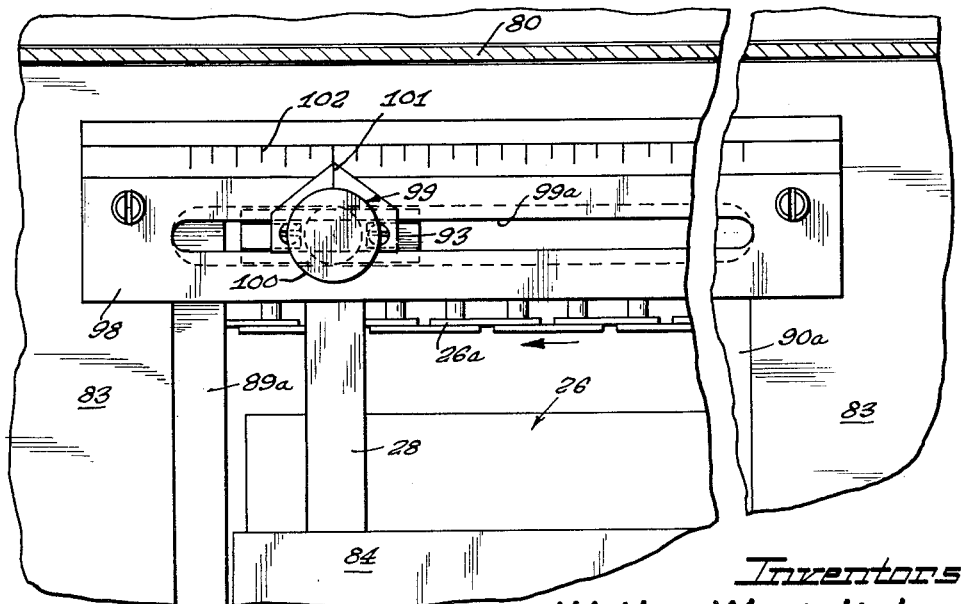

United States Patent Office 3,044,378
Patented July 17, 1962

3,044,378
ADJUSTABLE STOP AND RELEASE MECHANISM FOR PHOTOGRAPHIC APPARATUS
Walter Wanielista, Westchester, and Charles Peter Sippel, Jr., Villa Park, Ill., assignors to Robertson Photo-Mechanix, Inc., Chicago, Ill., a corporation of Illinois
Filed Oct. 14, 1959, Ser. No. 846,344
7 Claims. (Cl. 95—13)

The present invention relates to an improved mechanism for making printing plates and particularly to an apparatus for carrying a photographically sensitized sheet to an exposure station and accurately stopping the sheet and said station and to an improved mechanism for adjustably positioning the location at which said sheet is stopped and for releasing the sheet to move out of the exposure station.

The present invention contemplates the provision of a machine for performing a series of steps involved in making plates for offset printing machines. Individual photographically sensitized sheets are removed from a magazine at a storage supply station, carried to an exposure station where a latent image is produced on the sensitized face of the sheet, and subsequently delivered to a developing station where the latent image on the sensitized paper is transferred to a press plate member. The present invention relates primarily to the mechanism for carrying the sheet into the exposure station and controlling the position at which the sheet is stopped in aligned image receiving relation to a camera assembly, and released for delivery to the developing station.

An object of the invention is to provide an improved mechanism for stopping a carrier with a photographically sensitized sheet at an exposure station within a light-proof housing and for releasing the carrier externally of the housing after a latent image is placed on the sheet.

Another object of the invention is to provide an improved adjustable stop mechanism for a photographic apparatus wherein the stop can be adjusted and the mechanism will retain its lightproof integrity for succeeding operations wherein a photographically sensitized sheet is automatically stopped and released.

Another object of the invention is to provide a photographic mechanism of the type described with an improved adjustable stop assembly that is capable of improved operation and is of simplified construction.

Another object of the invention is to provide an automatic stop for a carrier and a photographic mechanism with an improved manual release arrangement which retains the lightproof integrity of the system and operates to release the stop for a range of positions of adjustment.

Other objects and advantages will become more apparent with the teaching of the principles of the invention in connection with the disclosure of the preferred embodiments thereof in the specification, claims and drawings, in which:

FIGURE 2 is a vertical sectional view taken substantially along line II—II of FIGURE 1;

FIGURE 3 is a vertical sectional view taken substantially along line III—III of FIGURE 1;

FIGURE 4 is a sectional view taken substantially along line IV—IV of FIGURE 2; and FIGURE 5 is a horizontal sectional view taken substantially along line V—V of FIGURE 2.

As shown on the drawings:

Figure 1:
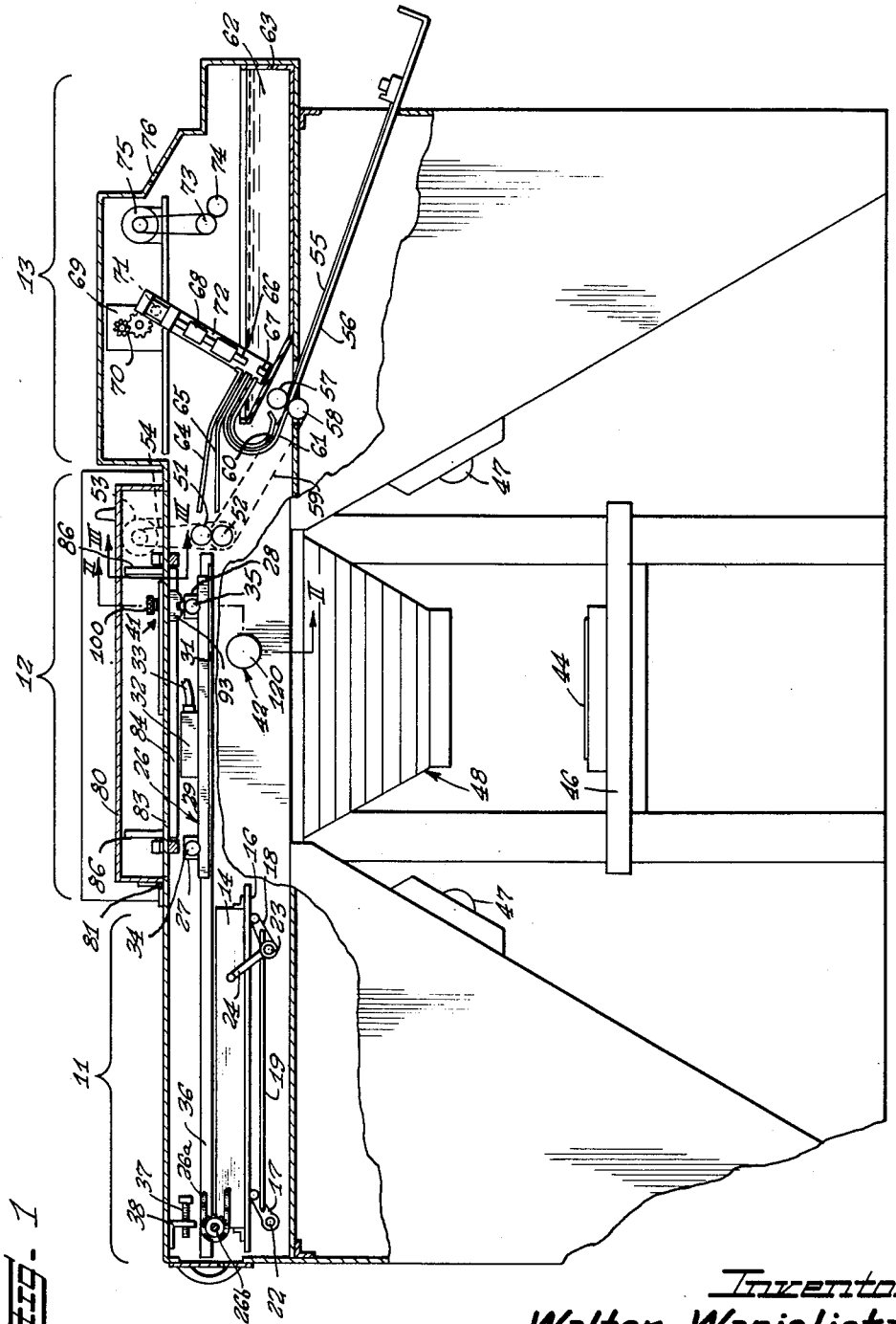
FIGURE 1 is a side elevational view of a photographic machine for making photographic copies or duplicates or printing plates, having parts broken away for purposes of illustration.

In FIGURE 1 the reference numeral 10 indicates generally a housing for the photographic assembly embodying the principles of the invention, the assembly being divided into three sections identified as a storage supply station 11, an exposure station 12, and a developing station 13. The storage supply station 11 is made light-tight and includes a supply of photographically sensitized sheet form members such as paper in a magazine indicated at 14, which is supported on a vertically movable platform 16.

The platform 16 is supported on a pair of opposed arms 17 and 18 connected by means of rods 19 and secured to their respective shafts 22 and 23. The connected arms serve to raise and lower the platform 16 by the operation of the manually operated crank arm 24 secured to the shaft 22 and accessible outside of the housing. The individual sheets from the magazine 14 are conveyed through the photographic assembly by means of a carrier indicated generally at 26. The carrier 26 includes cross top rails 27 and 28 secured to a top plate 29. A lower plate 31, having a grooved face, is joined to the upper plate 29 to provide a vacuum plate or holder generally referred to as a vacuum back, for transporting individual sheets of paper from the magazine 14 when the magazine is elevated to bring the uppermost sheets of a stack in the magazine 14 into contact with the lower plate 31. Affixed to the top plate 29 is a vacuum box 32 which is connected by means of a flexible tube 33 to a suitable source of reduced pressure such as a pump.

When the carrier is in the storage supply station 11 the magazine 14 is raised to bring the uppermost sheet in the magazine against the lower plate 31 which grips the uppermost sheet for carrying it through the machine when the magazine is lowered by operation of the crank 24. Although the illustrated form of the invention contemplates a vertically movable magazine, it will be appreciated that the required relative movement could also be effected by vertical adjustment of only the vacuum back or by vertical adjustment of both the magazine and the vacuum back.

The carrier 26 is moved through the assembly by means of rollers 34 and 35 attached at the ends of the cross top rails 27 and 28 respectively, and the rollers ride on rails 36 spaced inwardly from the sidewalls of the housing 10. As illustrated in FIGURE 2, the rail 36 is illustrated as being formed of a rectangular tube secured to a side frame member 40 extending along within the housing 10 and having an elongated track slot in one side. The carrier assembly 26 is positioned automatically in the storage supply station 11 in proper relation to the stack of sheets in the magazine 14 by the provision of a stop 37, FIGURE 1, which is threaded into an angle bracket 38. The stop 37 is adjustable so that the degree of overlap by which the sheet form member leads the vacuum back may be preset.

The carrier assembly 26 is detachably secured to a chain 26a passing over suitable sprockets such as 26b, one of which may be driven by a crank wheel accessible from outside of the housing 10 to drive the carrier assembly from the supply station 11 to the exposure station 12. The portion of the chain extending alongside of the rail 36 through the exposure station 12 is omitted for clarity. In the exposure station 12, a sensitized paper sheet transported by the carrier assembly 26 is exposed to produce a latent on its sensitized face. A copy 44 to be reproduced is supported on a vertically adjustable copy table 46 and is illuminated by spaced light 47. A camera assembly, generally indicated at 48 includes a lens system which focuses the image on the sensitized paper sheet. A suitable mechanism, as will be described, is provided for focusing and alignment of the sensitized sheet at the exposure station 12. The sensitized paper sheet is exposed for an appropriate time interval dependent upon an electrically operated timer, not shown.

The carrier 26 is automatically stopped by an adjustable stop mechanism illustrated generally at 41 and described in greater detail later herein. The stop mechanism 41 automatically stops the carrier at an aligned image receiving relation to the camera assembly 48. After exposure, the carrier 26 is released by a carrier release assembly 42, accessible from outside of the housing 10, and the sensitized paper with the latent image thereon is transferred from the exposure station. In the preferred arrangement, the sheet is transferred to the developing station 13 and the image is transferred to a press plate member conveniently comprising a sheet of sensitized aluminum foil. The exposed paper is sent to the developing station 13 by a pair of rubber covered feed rollers 51 and 52 mounted on shafts. A motor 53 drives the shafts through a chain 54. The rollers are separable by suitable mechanism while the paper is being moved from the supply station 12 into the exposure station 13 when the carrier 26 is released by the carrier release assembly 42.

In the developing station 13 a sensitized aluminum sheet press plate 55 is shown on a press plate support 56. The aluminum foil press plate 55 is sufficiently long to be received in the nip between a pair of feed rollers 57 and 58 driven by means of a belt 59 from the rollers 51 and 52. Upon energization of the motor 53, the feed rollers 51 and 52 serve to feed the sensitized aluminum foil 55 between a pair of arcuate guides 60 and 61 beneath the surface of a developing liquid 62 in a developing tank 63. At the same time, the exposed paper sheet is fed by means of the rollers 51 and 52 between a pair of angular guide channels 64 and 65 into the developing solution 62. The leading edges of the exposed sheet and the sensitized aluminum foil press plate 55 are brought together with the exposed surfaces of the sheet facing the sensitized surface of the aluminum foil by a suitable mechanism such as by a pair of jaws 66 and 67 which are brought together in gripping relationship by operating mechanism such as an electrically operated solenoid 68. The jaws grip the paper sheet and aluminum foil and pull them through the developing solution by the action of a motor 69 and gears 70. The jaws pivot around the axis provided by a shaft 71 which supports an arm 72 carrying the jaws. The speed of the motor 69 or the ratios of the gears 70 are adjusted so that the exposed sheet and the sensitized aluminum foil remain in the developing solution 62 for a time sufficient to transfer the image from the paper sheet to the sensitized aluminum foil. The sheets are then delivered into the nip existing between a pair of pressure rollers 73 and 74 driven by a motor 75 and emerge from between the rollers through a slotted opening 76 in the housing. The aluminum sheet with the image transferred thereon may be stripped from the paper sheet and is ready, after further drying if necessary, to be used as a printing plate on an offset printing assembly.

Returning to the details of the stop 41 and carrier release 42, and associated mechanism of the exposure station 12, the carrier 26 is shown in the drawings as being held by the stop mechanism 41.

The top of the housing 10 at the exposure station 12 is closed by a light excluding cover 80 hinged for pivotal movement about its rear edge on a hinge 81. The cover may be pivoted upwardly to open position for adjustment of the stop mechanism and then can be closed and retained in the closed position to retain the lightproof integrity of the exposure station without requiring reopening throughout continued operation.

The cover is mounted on a top plate 83 of the housing, the plate being provided with an opening 82. A light seal, such as a groove 80a may be provided in the upper surface of plate 83 for receiving the edge of the cover 80.

As illustrated in FIGURES 2 and 3, mounted in the opening 82 for vertical movement is a ground glass optical plate 84 secured to a suitable frame 84a. The plate 84 is supported on vertically extending brackets 85 and 86 suitably secured to the frame at each end thereof and provided with L-shaped slots 87 and 88 in order to move the ground glass optical plate between the dotted line and solid line positions of FIGURE 3. The plate supporting brackets 85 and 86 are supported on pins such as 89 and 90 which are mounted on crossbars 89a and 90a (FIGURE 4) at the ends of the opening 82. To drop the plate 84 to the broken line position of FIGURE 3, the brackets are shifted laterally to the right to move the rods 89 and 90 into the vertical portions of the slots 87 and 88. Leveling screws 91 and 92 project into the slots to adjustably level the ground glass plate 84. In the broken line position of the plate the image transmitted through the camera 48 appears on the plate 84 so that the camera can be focused and the stop 41 may be adjustably positioned in accordance with the position of the image. Once the adjustable stop 41 is set, the optical plate 84 is raised to the solid line position of FIGURE 3 and suspended in this position by moving the brackets laterally with the pins 89 and 90 in the horizontal portions of the slots 87 and 88.

The carrier 26 is automatically stopped in the exposure station in aligned image receiving relation to the camera assembly by an adjustable latch strike block 93 having a locking notch 94 facing downwardly. Received by the notch 94 is a locking plunger 95 having a tapered upper end 96 which causes it to positively seat against the sides of the rectangular notch 94 and prevent any play in the carrier once it has been locked. The latch block 93 slides for adjustment in an elongated slot 97 in the plate 83, extending in the direction of travel of the carrier 26. Above the slot is an adjustment holding plate 98 having a slot 98a therein extending parallel to the slot 97. The latch block has projections 93a and 93b extending up to slide in the slot 98a. An adjustment locking screw 99 is threaded down into the top of the latch block 93 (between the projections 93a and 93b) and has a knurled knob 100 which permits it to be tightened to draw the latch block against the lower surface of the plate 98 to lock the latch block 93 in adjusted position. The plate 98 is provided with a scale 102 having markings, and a pointer 101 is carried on the block 93 to show the adjusted position of the latch block 93. The pointer is attached to the top of the latch block.

The locking plunger 95 is mounted for vertical movement in a plunger holder 103 on the carrier 26 and the holder 103 has a plunger receiving well which supports a coil compression spring 104 seated in the well and urging upwardly against an annular flange or collar 105 on the plunger.

As illustrated in FIGURE 4, the latch block 93 is provided with a downwardly facing inclined approach ramp 106 so that the plunger will ride into the notch 94. A similar ramp 107 is provided on the other side of the block.

The locking plunger 95 is provided with an annular collar or flange 108 which prevents the spring 104 from forcing it out of the holder 103 when it is not engaging the latch block 93. Another flange 109, spaced below the flange 108 provides an upper shoulder for drawing the locking plunger downwardly when the latch is to be released by the carrier release mechanism 42. As will be appreciated, the flanges 108 and 109 may be in the form of removable collars secured to the plunger to permit its insertion into the holder 103 during assembly.

For releasing the stop mechanism 41, the plunger 95 is drawn downwardly by a pivotal trip plate 110 which has an upper horizontal portion 110a that projects between the flanges 108 and 109 so that when the trip plate is pivoted in a counterclockwise direction, as shown in FIGURE 2, the upper surface of the lower flange 109 will be engaged to draw the plunger 95 downwardly. The trip plate is pivotally supported on trunnion pins 111 and 112 at its ends secured to the plate and pivotally mounted in brackets 113 and 114 secured to the inner surface of the frame member 40. The trip plate has a lower vertical portion 110b to which is connected a downwardly extending bracket 115 with a downwardly facing open slot 116 to receive a plunger 117 of the carrier release 42. A pin 118 extends across the end of the plunger so that when the plunger is pulled outwardly, or to the right as is illustrated in FIGURE 2, the trip plate 110 will be rocked in a counterclockwise direction. A coil compression spring 119 between the bracket and the frame member 40 holds the trip plate 110 in the position illustrated and holds a knob 120 on the plunger against the outer surface of the housing, with the plunger being slidable in an opening 121 in the housing and an opening 122 in the frame member 40. This plunger maintains the lightproof integrity of the exposure station and permits external release of the carrier by merely pulling the knob 120 outwardly. The upper portion or ledge 110a of the trip plate extends longitudinally so that the lower flange or collar 109 will ride beneath it until the plunger 95 has cleared the notch 94.

As will be observed in FIGURE 4, the ledge 110a of the trip plate extends along the machine for the full adjustment range of the latch block 93 so that it operates regardless of the adjusted position of the stop mechanism.

In operation of the machine, as illustrated in FIGURE 1, the operator raises the magazine 14 by operating the crank 24 to raise a stack of sheets and a single sheet is picked up by the vacuum back on the carrier 26. The carrier is then moved forwardly into the exposure station 12, to the postion shown in FIGURE 1. The carrier is stopped by the stop mechanism 41 with the plunger 95 automatically locking in the notch 94 of the latch block 93. When the latent image has been placed on the sheet, the operator draws the knob 120 outwardly to pivot the trip plate 110, FIGURE 2, and draw the plunger downwardly whereupon the carrier is moved to the right in FIGURE 1 to transfer the sheet into the developing station 13. The location at which the carrier stopped in the exposure station is easily adjusted by lifting the cover 80, loosening the screw 99 and sliding the block to the adjusted position as indicated by the pointer 101. The cover is then closed to retain the lightproof integrity of the exposure station 12.

Thus it will be seen that we have provided an improved mechanism for a photographic assembly which meets the objectives and advantages hereinabove set forth. The device is simple and reliable in operation and construction and permits an easy and a wide range of adjustment of stop positions without affecting the efficient functioning release mechanism.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A mechanism for a photographic assembly comprising a photographically tight light excluding housing defining an exposure station therein, a carrier for conveying a photographically sensitized sheet to the exposure station in aligned image receiving relation to a camera assembly, a stop positioned to stop said carrier at said exposure station, adjustment means connected to said stop and accessible from outside of said housing, a light excluding cover on said housing for exposing or covering said adjustment means and maintaining the lightproof integrity of said exposure station when in a closed position, and release means for releasing said carrier from said stop so that the carrier may be moved past said exposure station without moving said cover from closed position.

2. A mechanism for a photographic assembly comprising a photographically tight light excluding housing defining an exposure station therein and having a cover opening, a carrier for conveying a photographically sensitized sheet to the exposure station in aligned image receiving relation to a camera assembly, a stop positioned to automatically stop said carrier at said exposure station, a visual indicating plate movably supported within said housing for movement to said exposure station or away from said exposure station and accessible through said cover opening, adjustment means on said housing beside said cover opening connected to said stop, a scale on said housing indicating the position of said stop, a light excluding cover on said housing mounted over said cover opening to cover said adjustment means and said opening in a closed position and movable to an open position, release means for releasing said carrier from said stop so that said carrier may be moved past said exposure station, and a release operator extending light excludingly through a wall of said housing for external release of the stop without admitting light to the housing and without opening said cover.

3. A mechanism for a photographic assembly comprising a photographically tight light excluding housing defining an exposure station therein, a carrier for conveying a photographically sensitized sheet to the exposure station in aligned image receiving relation to a camera assembly, a spring loaded plunger on the carrier urged outwardly, a stop member positioned to be engaged by said plunger in the exposure station and having a plunger receiving ramp leading to a notch for lockingly receiving the plunger, and a release operator accessible from outside of said housing and positioned to engage the plunger and move it out of said notch maintaining it out of the notch while the carrier is moved out of said exposure station.

4. A mechanism for a photographic assembly in accordance with claim 3 in which said stop member is adjustably supported on said housing for adjustment of its movement in the direction of movement of said carrier to vary the position of said exposure station.

5. A mechanism for a photographic assembly comprising a photographically tight light excluding housing defining an exposure station therein, a carrier for conveying a photographically sensitized sheet from a supply station to the exposure station in aligned image receiving relation to a camera assembly and on to a developing station, a stop means for determining the location at which said carrier is stopped in said exposure station including a plunger member and an abutment member with one of said members connected to the carrier and the other of said members connected to the housing, means for adjusting the relative position of the member mounted on the housing, spring means for urging the member on the carrier to stopping engagement with the member on the housing, an elongated release means mounted on the housing and extending along the path of said carrier to engage the member on the carrier and move it to release position regardless of the adjusted position of the member on the housing for movement of the carrier to said developing station, and means for moving said carrier to said stations.

6. A mechanism for a photographic assembly comprising a photographically tight light excluding housing defining an exposure station therein, a carrier for conveying a photographically sensitized sheet to the exposure station in aligned image receiving relation to a camera assembly, a stop positioned to stop said carrier at said exposure station, adjustment means connected to said stop and accessible from outside of said housing, and release means for releasing said carrier from said stop so that the carrier may be moved past said exposure station.

7. A mechanism for a photographic assembly comprising a photographically tight light excluding housing defining an exposure station therein, a carrier for conveying a photographically sensitized sheet to the exposure station in aligned image receiving relation to a camera assembly, a stop positioned to stop said carrier at said exposure station, adjustment means connected to said stop and accessible from outside of said housing for changing the position of the stop parallel to the direction of movement of the carrier, and release means for releasing said carrier from said stop so that the carrier may be moved past said exposure station including a manually operable control member mounted on said housing in a fixed location, including a release operator for releasing the carrier from the stop, and including a linkage means interconnecting the control member with the release operator permitting adjustment of said stop and maintaining the connection between the control member and release operator with said adjustment.

References Cited in the file of this patent

UNITED STATES PATENTS

| | | |
|---|---|---|
| 236,373 | Spilman | Jan. 4, 1881 |
| 2,118,449 | Wantz | May 24, 1938 |
| 2,483,872 | Bensen | Oct. 4, 1949 |
| 2,630,743 | O'Kane | Mar. 10, 1953 |
| 2,760,418 | Hauen | Aug. 28, 1956 |